Oct. 2, 1962 R. M. HENDERSON ETAL 3,056,913
VOLTAGE REGULATORS FOR GENERATORS
Filed Jan. 4, 1960 2 Sheets-Sheet 1
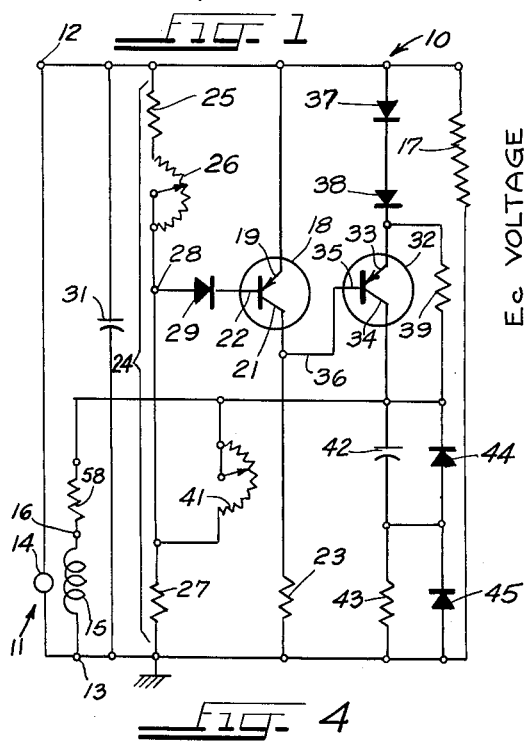
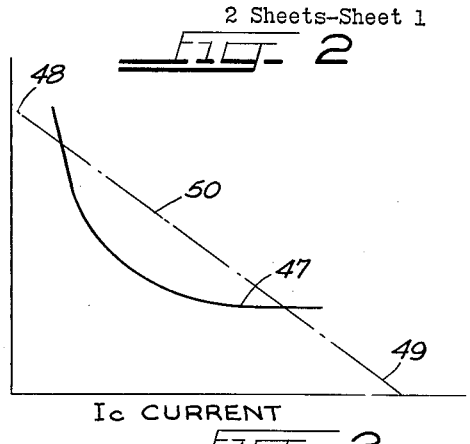
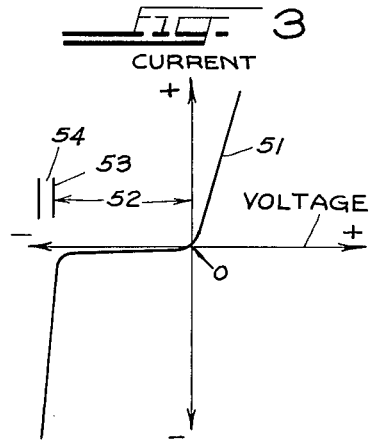
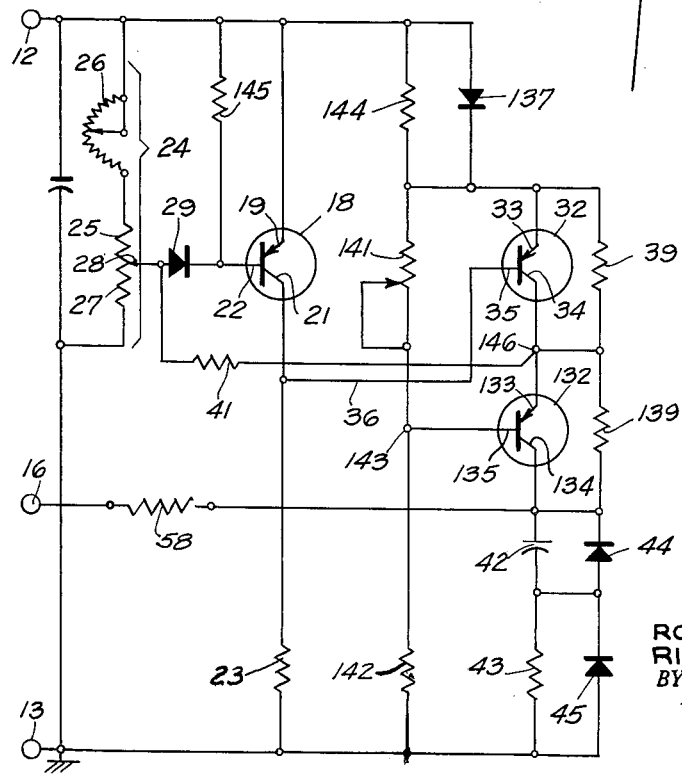
INVENTORS:
ROBERT M. HENDERSON
RICHARD ZECHLIN
BY
George A. Woodruff
ATTY.

Oct. 2, 1962 R. M. HENDERSON ETAL 3,056,913
VOLTAGE REGULATORS FOR GENERATORS
Filed Jan. 4, 1960 2 Sheets-Sheet 2

INVENTORS:
ROBERT M. HENDERSON
RICHARD ZECHLIN
BY George A. Woodruff
ATT'Y.

United States Patent Office 3,056,913
Patented Oct. 2, 1962

3,056,913
VOLTAGE REGULATORS FOR GENERATORS
Robert M. Henderson, Williams Bay, and Richard Zechlin, Beloit, Wis., assignors to Fairbanks, Morse & Co., Chicago, Ill., a corporation of Illinois
Filed Jan. 4, 1960, Ser. No. 134
7 Claims. (Cl. 322—28)

This invention relates to voltage regulators and more particularly to a new and improved voltage regulator for electrical generators. The invention is particularly advantageous as applied to direct current generators and especially generators of the type used on railroad locomotives and other comparable equipment, but is also applicable to other electrical generators.

In general, voltage regulation equipment for electrical generators, as heretofore known in the art, has operated by adjusting the impedance of the field circuit of the generator. That is, most of the known voltage regulators have included a variable impedance connected in series with the field coils of the generator, this variable impedance being increased under high voltage conditions and decreased when the output voltage of the generator falls below the desired value. With a system of this kind, it is of course necessary to dissipate at least some energy from the variable impedance and, in many instances, this requirement has resulted in relatively inefficient operation of the voltage regulators. Furthermore, many regulators of this kind have not been as accurate, and have not maintained the operating voltage within as close limits, as may be desired. On the other hand, voltage and current regulators have been proposed which provide for switching of the power circuit connected to a load. In general, regulators of this kind have relied upon capacitive storage devices, or other similar storage arrangements, to provide for energization of the load during instances in which the power circuit is interrupted by the regulator switching device.

It is the principal object of the present invention, therefore, to provide a new and improved voltage regulator for an electrical generator of the kind including an output circuit and a field circuit, which regulator operates by switching in the field circuit of the generator without interruption of the load circuit. A specific and related object of the invention is to afford a new and improved voltage regulator for electrical generators which exhibits extremely low internal losses, yet which provides highly accurate and effective voltage regulation substantially independent of the load applied to the generator.

Another object of the invention is to utilize transistors and other solid-state devices in an effective and efficient voltage regulator for relatively high-voltage high-current electrical generators, and particularly direct current generators.

Another object of the invention is to provide a new and improved transistor-operated voltage regulator which may be utilized with electrical generators having substantially different operating characteristics, with respect to both output voltage and field current characteristics. A specific object of the invention is to afford a single basic transistorized voltage regulator which may be conveniently adapted to use with generators having substantially different field current characteristics simply by inserting or changing a current-limiting resistor in circuit with the regulator.

An additional object of the invention is to afford a transistor-operated voltage regulator circuit for an electrical generator in which the application of the regulator to a given generator is not unduly limited by the voltage limitations or current-carrying capabilities of the transistors utilized in the regulator circuit.

An additional object of the invention is to provide a new and improved transistor-operated voltage regulator circuit, for an electrical generator, which is effective and efficient in operation at relatively high ambient temperatures.

Accordingly, the present invention is directed to a voltage regulator which is applicable to an electrical generator including an output circuit and a field circuit; these two circuits may have one common terminal. A voltage regulator constructed in accordance with the invention comprises a control transistor having input, output, and control electrodes, the input and output electrodes being connected across the output terminals of the generator, preferably in series with a current-limiting impedance. The regulator further includes a control circuit for actuating the control transistor between a first conduction condition and a second conduction condition in response to variations in the output voltage of the generator below and above a given threshold value. In a preferred embodiment, in the first conduction condition the control transistor is highly conductive and the control circuit renders the control transistor conductive only when the output voltage of the generator exceeds the aforementioned threshold value. The control circuit drives the control transistor to cut-off whenever the output voltage of the generator falls below that threshold value. This control circuit comprises a voltage divider which is connected across the output terminals of the generator and a zener diode which is connected between the voltage divider and the control electrode of the control transistor. A switching transistor is also incorporated in the voltage regulator, the input and output electrodes of this transistor being connected in series with the field circuit. Means are also provided, in the voltage regulator, for maintaining the switching transistor conductive whenever the control transistor is in its first conduction condition and for rendering the switching transistor non-conductive whenever the control transistor is in its second conduction state. This means comprises a circuit connecting the control transistor to the control electrode of the switching transistor. Furthermore, the voltage regulator is provided with means for accelerating the transition of both transistors between a non-conductive and a highly conductive condition, and this means preferably comprises a positive feedback circuit from the output electrode from the switching transistor to the control circuit connected to the control electrode of the control transistor.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a schematic diagram of a voltage regulator constructed in accordance with one embodiment of the invention, and shows the regulator connected to a D.C. generator and a load;

FIG. 2 is a graphic representation of certain operating characteristics of transistors, and is utilized in explaning the operation of the voltage regulator of FIG. 1;

FIG. 3 is a diagrammatic illustration of the operating characteristics of a zener diode incorporated in the voltage regulator of FIG. 1;

FIG. 4 is a schematic diagram of another embodiment of the invention, incorporating certain features not illustrated in the embodiment of FIG. 1;

Figure 5:
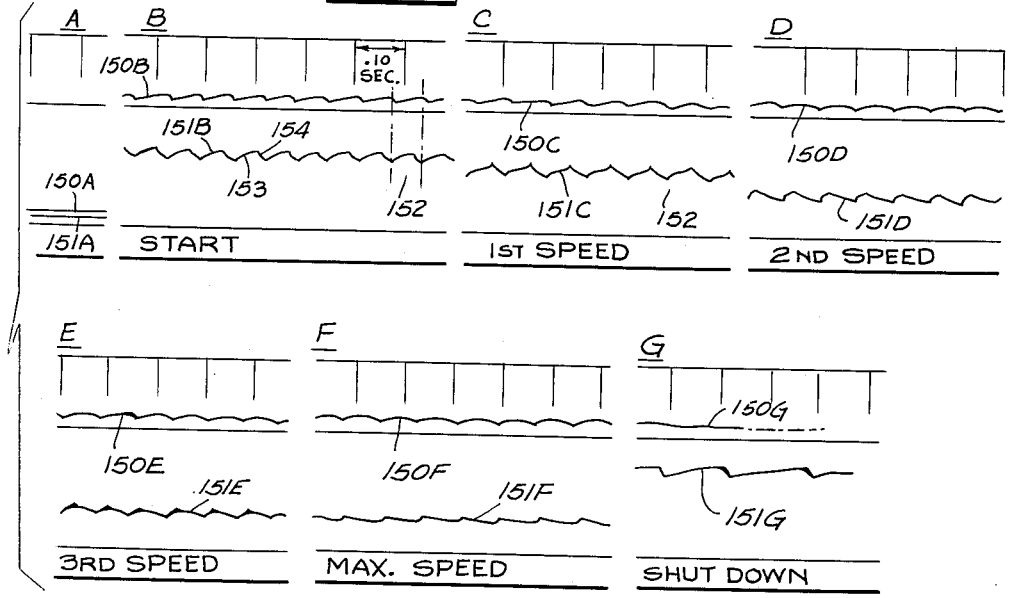
FIG. 5 is a reproduction of an oscillograph record illustrating operation of the circuit of FIG. 4 under a number of different operating conditions.

The apparatus illustrated in FIG. 1 comprises a voltage regulator 10 which is connected to an electrical generator 11. The generator 11 is a D.C. generator and includes the usual output circuit, comprising the output terminals 12 and 13 for the armature 14. The field coils for the generator 11 are generally indicated by the coil 15, which comprises the field circuit for the generator 11. The terminal 13 is common to the field circuit and the output circuit of the generator, the other or independent terminal of the field circuit being designated by the reference character 16. The common terminal 13 of the two circuits may be grounded if desired. The load for the generator 11, which may comprise any electrical device operated by the generator, is generally indicated by the resistor 17.

The voltage regulator 10 includes a control transistor 18 having the usual emitter electrode 19, collector electrode 21, and base electrode 22. The emitter electrode 19, which comprises the input electrode of the transistor 18, is connected to the output terminal 12 of the generator 11. The output electrode of the transistor, in this instance the collector 21, is connected through a current-limiting resistance 23 to the other terminal 13 of the generator output circuit. Thus, the input and output electrodes of thte transistor 18 are connected in series with the resistor 23 across the output circuit of the generator 11.

A voltage divider 24 is connected across the output terminals 12 and 13 of the generator 11. One side of the voltage divider 24 comprises a resistor 25 and a variable resistor 26, the other side of the voltage divider comprises a resistor 27. The center terminal 28 of the voltage divider is connected through a zener diode 29 to the control electrode of the transistor 18, in this instance the base electrode 22. The voltage divider 24 of the zener diode 29 affords a control circuit for actuating the control transistor 18 between a highly conductive operating condition and a non-conductive condition, as described more fully hereinafter. Preferably, a capacitor 31 is connected in parallel with this control circuit.

A switching transistor 32 is incorporated in the voltage regulator 10, the switching transistor having the usual emitter electrode 33, collector electrode 34, and base electrode 35. Actuation of the switching transistor 32 between a conductive and non-conductive condition is effected by means comprising a circuit connection 36 between the output electrode 21 of the control transistor 18 and the base or control electrode 35 of the switching transistor 32. The input and output electrodes 33 and 34 of the switching transistor, on the other hand, are connected in series with the field circuit 15 of the generator. The field-energizing circuit, in this instance, begins at the output terminal 12 of the generator and includes, in series, a first diode 37, a second diode 38, the input electrode 33, the output electrode 34, the field circuit terminal 16, the field coil 15, and the common terminal 13. In many instances, only one of the diodes 37 and 38 may be necessary, and specific examples of circuits of this kind are shown hereinafter. A resistor 39 is connected in parallel with the transistor 32 in the field circuit of the generator.

The voltage regulator 10 is also provided with circuit means for accelerating the transition of both transistors 18 and 32 between a non-conductive state and a highly conductive operating condition. In this instance, this circuit means comprises a resistor 41 which is connected from the output electrode 34 of the transistor 32 back to the common terminal 28 in the control circuit of the control transistor 18. In operation of the regulator 10, the resistor 41 affords a positive feedback path from the switching transistor to the control transistor, as described in greater detail hereinafter.

Provision is also included in the regulator 10 to protect the switching transistor 32 against unduly high voltages due to the inherent inductance of the field 15 of the generator, the same circuit means being effective to prevent undue power dissipation in the switching transistor. This protective circuit comprises a capacitor 42 connected in series with a resistor 43 across the input terminals 13 and 16 of the field coils 15. A diode 44 is connected in parallel with the capacitor 42, and a diode 45 is connected in parallel with the resistor 43.

In considering operation of the voltage regulator 10, it is first desirable to review briefly certain general operating characteristics of transistors (FIG. 2) and zener diodes (FIG. 3). Thus, for a given load, where collector voltage is plotted as a function of collector current, as in FIG. 2, the maximum dissipation capacity of the transistor may be approximately as illustrated by the curve 47. In order to avoid damage to the transistor, and consequent failure of the circuit in which it is incorporated, it is necessary to confine operation of the transistor as much as possible to low-current high-voltage conditions or low-voltage high-current conditions, as represented by the two partial load lines 48 and 49, respectively. The central portion 50 of the load characteristic is shown in dashlines, since the exact configuration is not readily determinable under high-speed switching conditions, as described hereinafter. Thus, the partial load line 48 represents a high-voltage low current condition, corresponding to operation of the transistor in the cut-off region. The curve 49, on the other hand, represents a high-current low voltage operating condition, the transistor being essentially saturated.

In FIG. 3, the normal operating characteristic of a zener diode, with current plotted as a function of voltage across the diode, is shown by the curve 51. When the diode is reverse-biased, as is the case in the regulator 10, the impedance of the diode is very high over a substantial range 52 extending from zero voltage to a given threshold value 53. Beyond the threshhold voltage 53, however, the impedance of the diode falls off very rapidly. In fact, within a very small range 54 beyond the threshold value 53, the impedance of the diode becomes essentially negligible. With the operating characteristics shown in FIGS. 2 and 3 in mind, consideration of the operation of the voltage regulator 10 of FIG. 1 is greatly simplified.

The potential at the terminal 28 of the voltage divider 24 is generally determined by the total potential across the output terminals 12 and 13 of the generator 14 and is established by the ratio of the resistances 25, 26 in one branch of the voltage divider with respect to the resistance 27 in the other branch, disregarding for the moment the alternate conduction path comprising the zener diode 29 and the transistor 18. For relatively low voltages, that is for voltages below the threshold voltage 53 of the diode (see FIG. 3), the impedance of the zener diode may be considered to be essentially infinite as compared with the impedance of the resistor 27. Consequently, the potential at the terminal 28 varies directly with changes in the output potential of the D.C. generator 11. For proper operation of the regulator 10, the threshold voltage 53 for the zener diode 29 must be smaller than the normal operating voltage of the generator 11. In the following discussion, it is assumed that the desired regulated voltage across the generator terminals 12 and 13 is seventy-two volts, whereas the zener voltage 53 of the diode 29 is approximately fifty-two volts; it should be understood that these voltage values are given solely by way of example and in no sense as a limitation upon the invention.

For effective operation, the voltage divider 24 is adjusted to afford a voltage drop of approximately fifty-two volts, the zener voltage of the diode 29, at the desired operating voltage for the generator, here taken as approximately seventy-two volts. As an initial assumption, it may be assumed that the generator voltage is lower than the desired regulation voltage. Under these circumstances, the effective voltage across the diode 29 (the voltage between terminals 12 and 28) is less than the threshold voltage of the zener diode. Consequently, the impedance in the base circuit or control circuit of the transistor is essentially infinite and no appreciable current flows therein. Accordingly, the transistor 18 is maintained in a substantially non-conductive operating condition, the current through the input-output path of the transistor, comprising the emitter 19 and the collector 21, being so small as to be negligible.

Under these circumstances, the collector electrode 21 of a control transistor 18 is established at a negative potential with respect to the potential at the emitter 33 of the switching transistor 32. Thus, since there is a direct connection 36 between the collector 21 of the transistor 18 and the base electrode 35 of the switching transistor, the switching transistor 32 is rendered conductive. Accordingly, the generator field 15 is energized through the operating circuit comprising the diodes 37 and 38 and the emitter-collector conduction path of the transistor 32. With the generator field thus energized, the voltage of the generator 11, across the output terminals 12 and 13, increases rapidly.

As the output voltage of the generator increases, the operating potential at the terminal 28 increases in proportion until the diode 29 passes the threshold value 53 (see FIG. 3). When this occurs, the effective impedance of the zener diode falls off very rapidly, as described hereinabove, with the result that a substantial current flows in the base circuit of the transistor 18. Accordingly, the transistor 18 is rendered conductive and a substantial current flow is established in the emitter-collector circuit of the control transistor. As a result, and since the transistor 18 is essentially a current amplifier, the relatively large change of current in the resistor 23 results in a substantial change in the current in the base electrode circuit of the switching transistor 32. The transistor 32 is thus effectively biased toward cut-off and is rendered non-conductive, thereby opening the operating circuit of the generator field coils 15.

It is thus seen that the voltage regulator 10 operates by, in effect, opening and closing the operating circuit of the generator field 15 rather than by merely adjusting a variable impedance in the field circuit of the generator. However, if the transition from the highly conductive condition, in the transistor 32, represented by the curve 49 in FIG. 2, to the high voltage condition represented by the curve 48, and vice versa, is relatively slow, the power dissipation required in the transistor 32 may exceed its dissipation capabilities as represented by the curve 47. Accordingly, it is essential to continued and dependable operation of the regulator 10 that the transition from conduction to non-conduction and back again be effected in relatively short intervals, preferably of the order of microseconds. The same considerations may be said to apply to the control transistor 18; however, since the current through this transistor is very small relative to the current through the switching transistor 32, the question of power dissipation is of substantially less importance than in the case of the control transistor.

Transition of both of the transistors 18 and 32 between their conductive operating conditions is greatly accelerated by the positive feedback circuit comprising the resistor 41. Thus, when the transistor 32 first begins to conduct, a substantial current flows through the feedback resistor 41 and, accordingly, through the resistor 27. Consequently, the voltage drop across the resistor 27 is increased, effectively reducing the voltage drop across the resistors 25 and 26, and accordingly, reducing the operating voltage applied to the zener diode 29. Accordingly, as soon as the transistor 32 begins to conduct, which conduction is initiated by a reduction of conduction in the control transistor 18, the output current from the transistor 32 effectively drives the transistor 18 further toward cut off, accelerating the transition of the control transistor from its conductive to its non-conductive condition. By the same token, however, the accelerated rate of reduction in current flow through the transistor 18 causes a corresponding acceleration in the rate of change in the conduction condition of the transistor 32 and cuts down the time interval required for the transistor 32 to reach full conduction. The reverse operation is also true. As soon as the voltage across the zener diode 29 increases to a substantial extent, in response to an increase in output voltage across the terminals 12 and 13, and the diode enters its low-impedance operating region 54 (see FIG. 3), the transistor 18 is biased toward conduction. Conduction in the transistor 18 tends to reduce conduction in the transistor 32, reducing the current through the feedback resistor 41 and hence reducing the total current through the resistor 27. The resulting reduction of potential drop across the resistor 27 causes the potential at the terminal 28 to rise at an accelerated rate, thereby rendering the transistor 18 highly conductive in substantially less time than would otherwise be required, and, accordingly, substantially shortening the interval required to cut off the switching transistor 32.

With most power transistors, such as the switching transistor 32, it is necessary that the base or control electrode 35 be driven positive with respect to the emitter or input electrode 33 in order to achieve complete cut off, particularly where the emitter-collector voltage is more than a few volts. It is for this reason that the diodes 37 and 38 and the resistor 39 are incorporated in the operating circuit of the emitter 33 of the switching transistor 32. These diodes are selected to afford a voltage drop, at a relatively low current determined by their internal resistance and the resistor 39, which is slightly larger than the voltage drop across the transistor 18, when the latter is in its high conductivity operating condition. Consequently, the base electrode 35 of the switching transistor 32 is held slightly positive with respect to the emitter 33 under high voltage conditions in operation of the generator 11. Typically, the voltage drop across each of the diodes 37 and 38, with the transistor 32 cut off and the transistor 18 conductive, may be of the order of 0.6 volt in each instance, whereas the drop across the transistor 18 may also be approximately of the order of 0.2 volt, leaving a 1.0 volt reverse bias on the emitter-base circuit of the switching transistor 32. Thus, the diodes 37 and 38 comprise a part of the operating circuit for the switching transistor 32 which is utilized to drive the switching transistor to substantially full cut off when the transistor 18 is fully conductive.

The resistor 39 connected across the transistor 32 is determined by two different requirements. First, the resistor must allow sufficient current to flow through the rectifiers 37 and 38 to afford a bias voltage large enough so that the transistor 32 can be cut off fully. Second, this resistor must have a minimum resistance large enough that, when the transistor 32 is cut off, the current in the field circuit is below that required at regulated voltage, high-speed, and no-load generator operating conditions. In a typical instance, as described more fully hereinafter in connection with FIG. 4, this resistor may be of the order of 100 ohms. Preferably, provision is made for connection of an external resistor 58 in the field circuit to adapt the regulator to use with generators having relatively low field-current requirements, although for many generators the resistor 58 may be omitted entirely.

FIG. 4 illustrates, in schematic form, a voltage regulator 110 which comprises another embodiment of the invention. In many respects, the voltage regulator 110 is essentially the same as the regulator 10 of FIG. 1; however, the regulator 110 is adapted for use with generators having a higher output voltage and also includes other changes and modifications to improve performance of the regulator under certain adverse operating conditions.

The initial or control portion of the regulator 110 is essentially the same as that described hereinabove in connection with FIG. 1. Thus, the voltage regulator includes the control transistor 18 connected in series with the current-limiting resistor 23 across the output terminals 12 and 13 of a generator to be controlled. As before, the base electrode 22 of the transistor is connected to a control circuit comprising the zener diode 29 and the voltage divider 24. As before, the voltage divider includes a variable resistor 26 to permit adjustment of the voltage divider. Further adjustment may be provided by combining the two resistors 25 and 27 of the voltage divider in a single resistor having a variable tap or terminal 28. The capacitor 31 is again connected in parallel with the voltage divider.

The regulator 110 also includes the switching transistor 32. As before, the base electrode 35 of the switching transistor is connected to the output electrode 21 of the control transistor 18. Furthermore, and also as in the first-described embodiment, the input and output electrodes 33 and 34 of the switching transistor are connected in a series circuit from the generator output terminal 12 to the field terminal 16. The feedback resistor 41 is again connected from the collector 34 back to the zener diode 29.

The field circuit, however, is somewhat modified as compared with the corresponding portion of the regulator 10 of FIG. 1. Thus, in the embodiment of FIG. 4 a single diode 137 is incorporated in the emitter circuit of the switching transistor 32. The collector circuit of the switching transistor 32 is not connected directly to the field terminal 16. Rather, a second switching transistor 132 is connected in series with the switching transistor 32. Thus, the emitter 133 of the second switching transistor is connected to the collector 34 of the first switching transistor, whereas the collector 134 of the second switching transistor is connected to the field terminal 16. The collector 134 is also connected to the buffer circuit comprising the capacitor 42, the resistor 43, and the two diodes 44 and 45. As in the first-described embodiment, a resistor 39 is connected in parallel with the emitter-collector circuit of the first switching transistor 32; a second similar resistor 139 is connected in parallel with the input-output conduction path of the second switching transistor 132. If desired, the feedback resistor 41 may be connected to the collector B4 of the transistor 132 instead of to the collector of the first control transistor, or even to the field terminal 16.

The control circuit for the second switching transistor 132 comprises a voltage divider connected from the emitter 33 of the first switching transistor to the common terminal 13 of the regulator circuit. This voltage divider includes a variable resistor or potentiometer 141 connected in series with a fixed resistor 142, the center terminal 143 of the voltage divider being connected to the base electrode 135 of the second switching transistor 132. In addition, a further resistor 144 is preferably connected in parallel with the diode 137 in the input circuit of the transistor 32, and a resistor 145 is connected from the base electrode 22 of the control transistor 18 back to the output terminal 12 of the generator. The resistors 144 and 145 are particularly advantageous in those applications where the regulator may be required to operate at relatively high ambient temperatures, as described more fully hereinafter.

The basic operation of the voltage regulator 110 is substantially similar to that described hereinabove in connection with the regulator 10 (FIG. 1). Thus, if the generator voltage across the terminals 12 and 13 is lower than the desired regulation voltage, the voltage divider 24 effectively divides the operating voltage so that the potential across the zener diode 29 is below the threshold or breakdown voltage of the diode. Consequently, the control transistor 18 is cut off and no substantial current flows in the input-output circuit of the control transistor. Accordingly, and as described hereinabove, the switching transistor 32 is maintained in a highly conductive operating state by means of the control connection 36 between the collector 21 of the control transistor and the base 35 of the switching transistor. At the same time, the emitter 133 of the second switching transistor 132 is established at a positive potential higher than the base electrode 135 of this transistor. Accordingly, the second switching transistor 132 is also rendered conductive and an energizing current is supplied to the field through the field terminal 16.

When the output voltage across the generator terminals 12 and 13 exceeds the regulation value, the diode 29 is biased beyond its zener potential 53 (see FIG. 3) and the control transistor 18 is rendered conductive in the same manner as described hereinabove. Accordingly, conduction in the switching transistor 32 is interrupted in the same manner as in the first-described embodiment. During the transition period in which the switching transistor 32 goes from its conductive to its non-conductive operating condition, the voltage between the emitter 33 and the collector 34 increases rapidly. When the voltage at the terminal 146 between the transistors 32 and 132 reaches a lower voltage than the voltage at the terminal 143 in the voltage divider 141, 142, the second switching transistor 132 also is driven to cut off. Preferably, the voltage divider 141, 142 is adjusted to divide the operating voltage approximately equally between the two switching transistors. Thus, with this arrangement operation is essentially similar to the circuit of FIG. 1 except that the two transistors 32 and 132, in their series connection, divide the operating voltage between them, with the result that the regulator can be used to control a generator having a substantially higher operating voltage than would otherwise be possible.

Disregarding for the moment the resistor 145, it may be seen that, at generator voltages below the zener voltage of the diode 29, the base electrode 22 of the control transistor 18 appears to be open circuited, due to the virtually infinite impedance of the diode. Under open circuit base conditions, and with high ambient temperatures (temperatures of the order of 140° F. and up) there may be substantial thermal current flow in the emitter-collector conduction path of the control transistor. If the voltage across the transistor is extremely low, as for example, six volts or below, as during the build-up period when the generator is first placed in operation, the current through the collector 21 of the control transistor may be sufficient to prevent the flow of base current from the switching transistor 32. Under these circumstances, the switching transistor 32 is not rendered conductive, only a very small current flows in the field circuit of the generator, and the generator cannot build up.

The addition of the resistor 145 to the circuit of the regulator 110 is of substantial advantage in overcoming this problem of operation at relatively high ambient temperatures. With the resistor connected as shown in FIG. 4, the base 22 of the control transistor 18 no longer functions as if it were open-circuited. Rather, it now functions as if it were short-circuited to the emitter 19. With the emitter and base electrodes of the control transistor 18 thus effectively short-circuited, and at relatively low voltages, virtually no current flows in the collector electrode 21 of the control transistor. Consequently, current can flow in the base circuit of the switching transistor 32, through the resistor 23, permitting the switching transistor 32 to conduct. Accordingly, a substantial field current flows in the regulator circuit and the generator is able to build up its operating voltage.

The resistor 144 is also incorporated in the regulator 110 to aid in the build-up of the generator voltage. As explained hereinabove, the rectifier 137 is utilized to bias the switching transistor 132 to complete cut-off by making it possible for the control electrode 35 to go positive with respect to the input electrode 33. This bias, although highly desirable at regulating voltages, is not particularly desirable at low voltages (for example, six volts and below) such as are encountered when the generator is first placed in operation. With the resistor 144 connected in parallel with the diode 137, however, this biasing effect is essentially eliminated at low voltages.

Thus, the effective impedance of the rectifier 137, at low voltages, is quite high. Accordingly, the parallel combination of the diode with the resistor 144 has an effective impedance, at these voltages, which is determined by the impedance of the resistor 144. In this manner, the resistor 144 effectively nullifies the diode 137 at extremely low voltages. At higher voltages, on the other hand, the effective impedance of the diode 137 is relatively low. In fact, at higher voltages the impedance of the diode is substantially smaller than that of the resistor 144. Consequently, at normal operating voltages, the diode 137 effectively determines the impedance in the input circuit of the switching transistor 32; the resistor 144 is now substantially negligible in effect. Accordingly, the biasing effect of the diode 137 is retained when required, at normal operating voltages, but is eliminated at the relatively low voltages where it might interfere with generator build-up. The two resistors 144 and 145 thus make it possible to build up the generator voltage under conditions of high ambient temperature.

In order to afford a more complete illustration of a typical embodiment of the invention, certain specific data are set forth hereinafter with respect to the regulator 110 illustrated in FIG. 4. It should be understood that these data are provided merely by way of example and illustration, and in no sense as a limitation upon the invention.

| | |
|---|---|
| Capacitor 31 | 1300 microfarads. |
| Capacitor 42 | 200 microfarads. |
| Resistor 23 | 100 ohms. |
| Resistors 25, 27 | 150 ohms adjustable. |
| Resistor 26 | 35 ohms. |
| Resistor 41 | 2000 ohms. |
| Resistor 43 | 50 ohms. |
| Resistors 39 and 139 | 100 ohms. |
| Resistor 141 | 150 ohms adjustable. |
| Resistor 142 | 100 ohms. |
| Resistor 144 | 1.5 ohms. |
| Resistor 145 | 50 ohms. |
| Diodes 44, 45 and 137 | 300 PIV. |
| Transistor 18 | Type 2N456. |
| Transistors 32 and 132 | Type 2N1099. |
| Diode 29 | 52 volt zener. |

FIG. 5 comprises a series of oscillograph traces showing the operating voltage and field current of a generator, connected in a conventional locomotive operating circuit, using the regulator 110 of FIG. 4, at varying speed settings. Average current and voltage values are indicated on the graphs. Thus, the initial trace A in FIG. 5 shows the generator in quiescent state. The voltage curve 150A and the field current trace 151A are, as expected, simply linear traces.

In the second section B of FIG. 5, the generator has been started and is operated at a relatively low speed. Under these conditions, as shown in this figure, the voltage trace 150B shows a relatively small ripple. The field current trace 151B, on the other hand, is of sharply defined saw tooth form, indicating the rapid opening and closing of the field circuit of the generator caused by the operation of the voltage regulator.

Section C of FIG. 5 illustrates generator operating conditions essentially similar to section B, but with a reduced load applied to the generator. As indicated by the field current trace 151C, the field circuit remains closed for shorter intervals, relative to the trace in curve B, and the field current is effectively reduced. As before, however, the voltage trace 150C exhibits only relatively minor fluctuations. The period or cycle time for operation of the regulator, as indicated by the reference numeral 152, is substantially the same in both of the sections B and C of FIG. 5, but the field current increases during a lesser portion of each cycle as compared with the period of decrease in field current when the generator is under a smaller load.

Sections D, E and F of FIG. 5 illustrate the operating conditions for the generator and the changes in those operating conditions with incremental increases in speed of the generator. As indicated by the traces 150D, 150E and 150F in these charts, the variations in the output voltage are held within approximately the same limits, regardless of the speed of the generator. With increasing speed, on the other hand, the portion of each operating cycle in which the field is energized, these being the portions of increasing field current, grow proportionately shorter, as indicated by the oscillograph traces 151D, 151E and 151F. Thus, in FIG. 5F, the average current is substantially smaller than in FIGS. 5B and 5C. Section G of FIG. 5 illustrates the effect of return of the generator to low-speed operating conditions after a substantial period of operation. As indicated therein by the voltage and current traces 150G and 151G, the operating conditions are essentially the same as when the generator was first started, as may be seen by comparison of sections G and B of FIG. 5.

Each of these oscillograph traces is also important in that they afford a clear indication of the abrupt and rapid manner in which switching is effective in the field circuit. Thus, by reference to chart B in FIG. 5, it is seen that the transition from the closed field circuit condition, indicated by the rising portion 153 of the field current curve 151B, to the closed circuit condition indicated by the falling portion 154 of the current trace, is extremely sharp. It is thus apparent that switching from the closed circuit condition to the open circuit condition is effected in a matter of microseconds, and the same is true of the closing of the field circuit. This rapid switching, as explained hereinabove, is greatly enhanced by the use of the positive feedback circuit comprising the resistor 41 (FIGS. 1 and 4) and is essential in preventing operation of the switching transistors in the portions of their operating characteristics which would exceed the dissipation capabilities of the transistors, as explained in connection with FIG. 2.

Figures 6, 7:
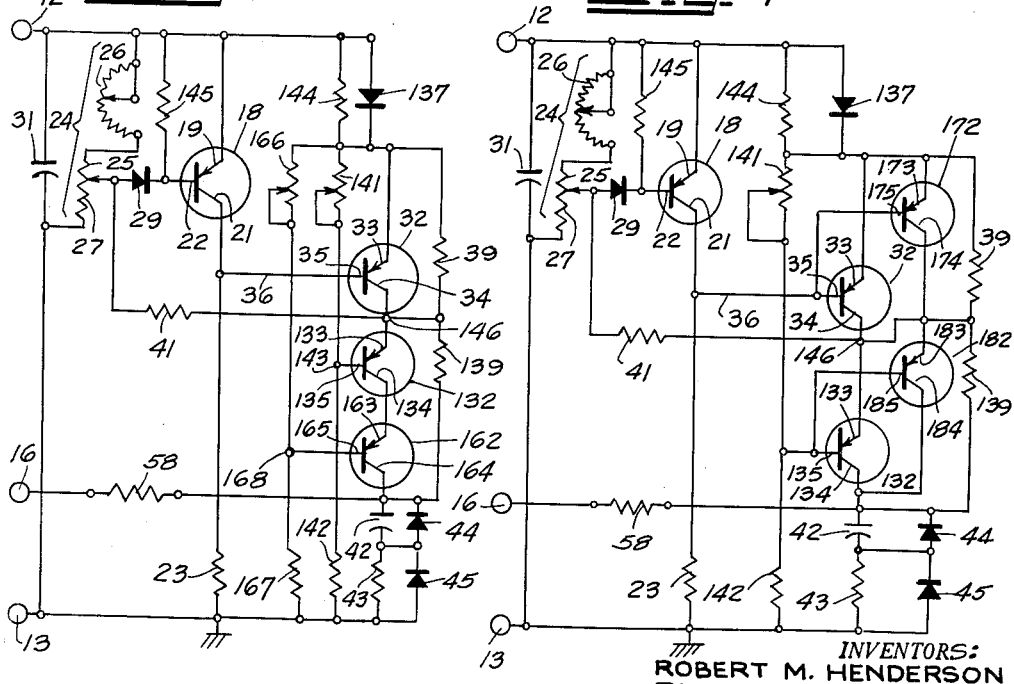
FIG. 6 is a schematic diagram of another embodiment of the invention for use with an electrical generator having a substantially higher output voltage.
FIG. 7 illustrates yet another embodiment of the invention which is particularly suitable for use with an electrical generator requiring relatively high field current.

FIG. 6 illustrates a voltage regulator 160 which comprises a further embodiment of the invention. Essentially, the regulator 160 is the same as the previously described regulator 110 of FIG. 4 except that it is adapted for use with even higher voltage machines than the previously described embodiments. Thus, in the regulator 160, the voltage-sensing circuit or control circuit comprising the voltage divider 24, the capacitor 31, and the zener diode 29 remains essentially the same. The control transistor 18 is incorporated in the operating circuit of the regulator in the same way as before and is again connected in the control circuit of the initial switching transistor 32. The switching transistor 32 is again incorporated in the field circuit of the generator, by connection in the series circuit of the field terminal 16 and, through the diode 137 with the output terminal 12 of the generator. Furthermore, the switching transistor 32 is again connected to a positive feedback circuit comprising the resistor 41 to accelerate transition of the transistors 18 and 32 between their conductive and non-conductive operating conditions.

Like the embodiment of FIG. 4, the regulator 160 of FIG. 6 includes a second switching transistor 132 connected in series with the first switching transistor 32. Again, the control circuit for the second switching transistor comprises the voltage divider 141, 142. In this instance, however, a third switching transistor 162 is connected in series in the field circuit portion of the regulator. That is, the emitter 163 of the transistor 162 is connected to the collector 134 of the transistor 132, and the collector 164 of the third switching transistor is connected back to the field circuit terminal 16 and to the buffer circuit 42—45.

The control circuit for the third switching transistor 162 is essentially similar to that for the second switching transistor 132. Thus, this control circuit comprises a voltage divider including an adjustable resistor 166 and a fixed resistor 167 connected in series with each other between the input electrode 33 of the first switching transistor 32 and the common terminal 13 of the regulator circuit. The center terminal 168 of this voltage divider is connected to the base or control electrode 165 of the third switching transistor 162. The feedback resistor 41 may be connected to either of the collector electrodes 134 and 164, or to the field terminal 16, if desired, instead of to the collector 34, if desired.

Operation of the regulator 160 is essentially similar to the previously described embodiments of the invention and therefore need not be described in detail. The two voltage dividers 141, 142 and 166, 167 are preferably adjusted to divide the voltage across the series circuit comprising the three transistors 32, 132 and 162 in a manner such that the voltage across each transistor is approximately equal. In this way, three switching transistors each having relatively low maximum voltage limits are combined in the switching circuit to control a generator having a much larger output voltage.

The voltage regulator 170 illustrated in FIG. 7 is also a modified embodiment based primarily upon the voltage regulator 110 of FIG. 4. Thus, the initial control circuitry of the regulator comprising the voltage divider 24, the zener diode 29, and the control transistor 18 is essentially the same as described hereinabove. In this regulator, the combination of two switching transistors 32 and 132 is also employed in essentially the same manner as in the regulator 110 described hereinabove. In this instance, however, the regulator circuit is adapted for use with a generator requiring a relatively high field current.

Thus, in the circuit 170 of FIG. 7, a third switching transistor 172 having an emitter electrode 173, a collector electrode 174, and a base electrode 175 is incorporated in the circuit, being connected directly in parallel with the first switching transistor 32. That is, the input, output, and control electrodes of the transistor 172 are each directly connected to the corresponding electrodes of the first switching transistor 32. The regulator 170 further includes a fourth switching transistor 182 having an emitter electrode 183, a collector electrode 184, and a base electrode 185. This fourth switching transistor is directly connected in parallel with the second switching transistor 132, the input, output, and control electrodes of each transistor being directly connected to the corresponding electrodes of the other. Operation of the circuit of FIG. 7 is exactly the same as that of FIG. 4 except that the addition of the third and fourth switching transistors 172 and 182 affords additional current-carrying capacity in the field circuit portion of the regulator and enables the regulator to function properly with a generator requiring relatively high field currents.

Each of the several embodiments of the invention described hereinabove controls the output voltage of the generator by switching the field circuit on and off without interruption of the load circuit. Consequently, the losses in the regulator are extremely small. On the other hand, as clearly illustrated in FIG. 5, the regulator circuits are quite accurate in operation and may readily be constructed to hold voltage deviations to one percent or less. If even smaller voltage deviations are required, an additional amplifier stage may be incorporated in the voltage regulator between the control transistor 18 and the switching transistors. The basic regulator circuit is readily adaptable to generators having substantially different field current requirements, simply by incorporating or changing the one resistor 58 in the field circuit. On the other hand, addition of one or more switching transistor stages to the fundamental regulator circuit affords an effective and economical means for constructing regulator suitable for use with virtually any generator. Consequently, the regulator is not unduly limited by the operating characteristics of the transistors employed.

Hence, while we have illustrated and described the preferred embodiments of our invention, it is to be understood that these are capable of variation and modification.

We claim:

1. A voltage regulator for a generator including an output circuit and a field circuit, said voltage regulator comprising: a control transistor having input, output and control electrodes, said input and output electrodes being connected to said output circuit; a control circuit for actuating said control transistor to a first conduction condition whenever the output voltage across said output circuit falls below a given threshold value and for actuating said control transistor to a second conduction condition whenever said output voltage exceeds said threshold value, said control circuit comprising a voltage divider connected to said output circuit and a zener diode connected between said voltage divider and the control electrode of said control transistor; a switching transistor having input, output and control electrodes, said input and output electrodes being connected in series with said field circuit; means, including a circuit connecting said control transistor to said control electrode of said switching transistor, for maintaining said switching transistor conductive whenever said control transistor is in said first conduction condition and for rendering said switching transistor non-conductive whenever said control transistor is in said second conduction state; means for accelerating transition of both transistors between a non-conductive and a highly conductive condition; and a transistor protecting circuit comprising a capacitor and a resistor connected in series with each other and in parallel with said field circuit, and rectifier means connected in parallel with said capacitor and said resistor.

2. A voltage regulator for a generator including an output circuit and a field circuit, said voltage regulator comprising: a control transistor having input, output and control electrodes, said input and output electrodes being connected to said output circuit; a control circuit for actuating said control transistor to a first conduction condition whenever the output voltage across said output circuit falls below a given threshold value and for actuating said control transistor to a second conduction condition whenever said output voltage exceeds said threshold value, said control circuit comprising a voltage divider connected to said output circuit and a zener diode connected between said voltage divider and the control electrode of said control transistor; a switching transistor having input, output and control electrodes, said input and output electrodes being connected in series with said field circuit; means, including a circuit connecting said output electrode of said control transistor to said control electrode of said switching transistor, for maintaining said switching transistor conductive whenever said control transistor is in said first conduction condition and for rendering said switching transistor non-conductive whenever said control transistor is in said second conduction state; a positive feedback circuit connecting the output electrode of said switching transistor to said zener diode for accelerating transition of both transistors between a non-conductive and a highly conductive condition; and a transistor protecting circuit comprising a capacitor and a resistor connected in series with each other and in parallel with said field circuit, and rectifier means connected in parallel with said capacitor and said resistor.

3. A voltage regulator for a generator including an output circuit and a field circuit each having two terminals, one terminal being common to the two circuits and the remaining terminals being in one of said circuits independent of the remaining circuit, said voltage regulator comprising: a control transistor having input, output and control electrodes, said input and output electrodes being connected in series with a current-limiting impedance across said output circuit terminals; a control circuit for actuating said control transistor to a first non-conductive operating condition whenever the output voltage across said output circuit falls below a given threshold value and for actuating said control transistor to a second highly conductive condition whenever said output voltage exceeds said threshold value, said control circuit comprising a voltage divider connected across said output circuit terminals and a zener diode connected between said voltage divider and the control electrode of said control transistor; a switching transistor having input and output electrodes connected in series with said field circuit and a control electrode, said output electrode being connected to the independent terminal of said field circuit; means, including a rectifier connected between the input electrode of said switching transistor and the independent terminal of said output circuit, and a circuit connecting said control transistor to said control electrode of said switching transistor, for maintaining said switching transistor conductive to energize said field circuit whenever said control transistor is in said first conduction condition and for rendering said switching transistor non-conductive whenever said control transistor is in said second conduction state, means comprising a positive feedback circuit from said switching transistor to said control circuit for accelerating transition of both transistors between a non-conductive and a highly conductive condition, and a transistor protecting circuit comprising a capacitor and a resistor connected in series with each other and in parallel with said field circuit, and rectifier means connected in parallel with said capacitor and said resistor.

4. A voltage regulator for a generator including an output circuit and a field circuit, said voltage regulator comprising: a control transistor having input, output and control electrodes, said input and output electrodes being connected to said output circuit; a control circuit for actuating said control transistor to a first conduction condition whenever the output voltage across said output circuit falls below a given threshold value and for actuating said control transistor to a second conduction condition whenever said output voltage exceeds said threshold value, said control circuit comprising a voltage divider connected to said output circuit and a zener diode connected between said voltage divider and the control electrode of said control transistor; at least first and second switching transistors each having input, output and control electrodes, said input and output electrodes of all of said switching transistors being connected in series with each other and with said field circuit; means, including a first actuating circuit connecting the output electrode of said control transistor to the control electrode of said first switching transistor and a second actuating circuit connecting said first switching transistor to the control electrode of the other switching transistors, for maintaining all of said switching transistors conductive whenever said control transistor is in said first conduction condition and for rendering all of said switching transistors non-conductive whenever said control transistor is in said second conductive state, a positive feedback circuit, from one of said switching transistors to said control circuit, for accelerating transition of all of said transistors between a non-conductive and highly conductive condition, and a transistor protecting circuit comprising a capacitor and a resistor connected in series with each other and in parallel with said field circuit, and rectifier means connected in parallel with said capacitor and said resistor.

5. A voltage regulator for a generator including an output circuit and a field circuit, said voltage regulator comprising: a control transistor having input, output and control electrodes, said input and output electrodes being connected to said output circuit; a control circuit for actuating said control transistor to a first conduction condition whenever the output voltage across said output circuit falls below a given threshold value and for actuating said control transistor to a second conduction condition whenever said output voltage exceeds said threshold value, said control circuit comprising a voltage divider connected to said output circuit and a zener diode connected between said voltage divider and the control electrode of said control transistor; two pairs of switching transistors, each having input, output and control electrodes, said switching transistors being connected in series-parallel relation with each other with said input and output electrodes of each switching transistor being connected in series with the other switching transistor of its pair and with said field circuit; means, including a first pair of actuating circuits connecting said control transistor to the control electrodes of the first switching transistor in each pair and a pair of second actuating circuits connecting said first switching transistor of each pair to the control electrode of the second switching transistor of that pair, for maintaining all of said switching transistors conductive whenever said control transistor is in said first conduction condition and for rendering all of said switching transistors non-conductive whenever said control transistor is in said second conduction state; and a positive feedback circuit from said output electrode of the first switching transistor in each pair to said control circuit for accelerating transition of all of said transistors between a non-conductive and a highly conductive condition.

6. A voltage regulator for a generator including an output circuit and a field circuit, said voltage regulator comprising: a control transistor having input, output and control electrodes, said input and output electrodes being connected to said output circuit; a control circuit for actuating said control transistor to a first conduction condition whenever the output voltage across said output circuit falls below a given threshold value and for actuating said control transistor to a second conduction condition whenever said output voltage exceeds said threshold value, said control circuit comprising a voltage divider connected to said output circuit, a zener diode connected between said voltage divider and the control electrode of said control transistor, and a bias resistor connected between the input and control electrodes of said control transistor; a switching transistor having input, output and control electrodes, said input and output electrodes being connected in series with said field circuit; means, including a circuit connecting said control transistor to said control electrode of said switching transistor, for maintaining said switching transistor conductive whenever said control transistor is in said first conduction condition and for rendering said switching transistor non-conductive whenever said control transistor is in said second conduction state; means comprising a positive feedback circuit from said switching transistor to said control circuit for accelerating transition of both transistors between a non-conductive and a highly conductive condition; and a transistor protecting circuit comprising capacitor and a resistor connected in series with each other and in parallel with said field circuit, and rectifier means connected in parallel with said capacitor and resistor.

7. A voltage regulator for a generator including an output circuit and a field circuit each having two terminals, one terminal being common to the two circuits and the remaining terminals being in one of said circuits independent of the remaining circuit, said voltage regulator comprising: a control transistor having input, output and control electrodes, said input and output electrodes being connected in series with a current-limiting impedance across said output circuit terminals; a control circuit for actuating said control transistor to a first non-conductive operating condition whenever the output voltage across said output circuit falls below a given threshold value and for actuating said control transistor to a second highly conductive condition whenever said output voltage exceeds said threshold value, said control circuit comprising a voltage divider connected across said output circuit terminals and a zener diode connected between said voltage divider and the control electrode of said control transistor; a switching transistor having input and output electrodes connected in series with said field circuit and a control electrode, said output electrode being connected to the independent terminal of said field circuit; means, including a rectifier connected between the input electrode of said switching transistor and the independent terminal of said output circuit, a resistor connected in shunt relation to said rectifier, said resistor having a resistance substantially smaller than the internal resistance of said rectifier at low voltages and substantially larger than the internal resistance of said rectifier at high voltages, and a circuit connecting said control transistor to said control electrode of said switching transistor, for maintaining said switching transistor conductive to energize said field circuit whenever said control transistor is in said first conduction condition and for rendering said switching transistor non-conductive whenever said control transistor is in said second conduction state, means comprising a positive feedback circuit from said switching transistor to said control circuit for accelerating transition of both transistors between a non-conductive and a highly conductive condition, and a transistor protecting circuit comprising a capacitor and a resistor connected in series with each other and in parallel with said field circuit, and rectifier means connected in parallel with said capacitor and said resistor.

References Cited in the file of this patent
UNITED STATES PATENTS
2,945,174     Helzler _____ July 12, 1960